Oct. 29, 1935.  F. T. ROBERTS  2,019,361
APPARATUS FOR MAKING HOLLOW RUBBER ARTICLES
Filed June 12, 1931
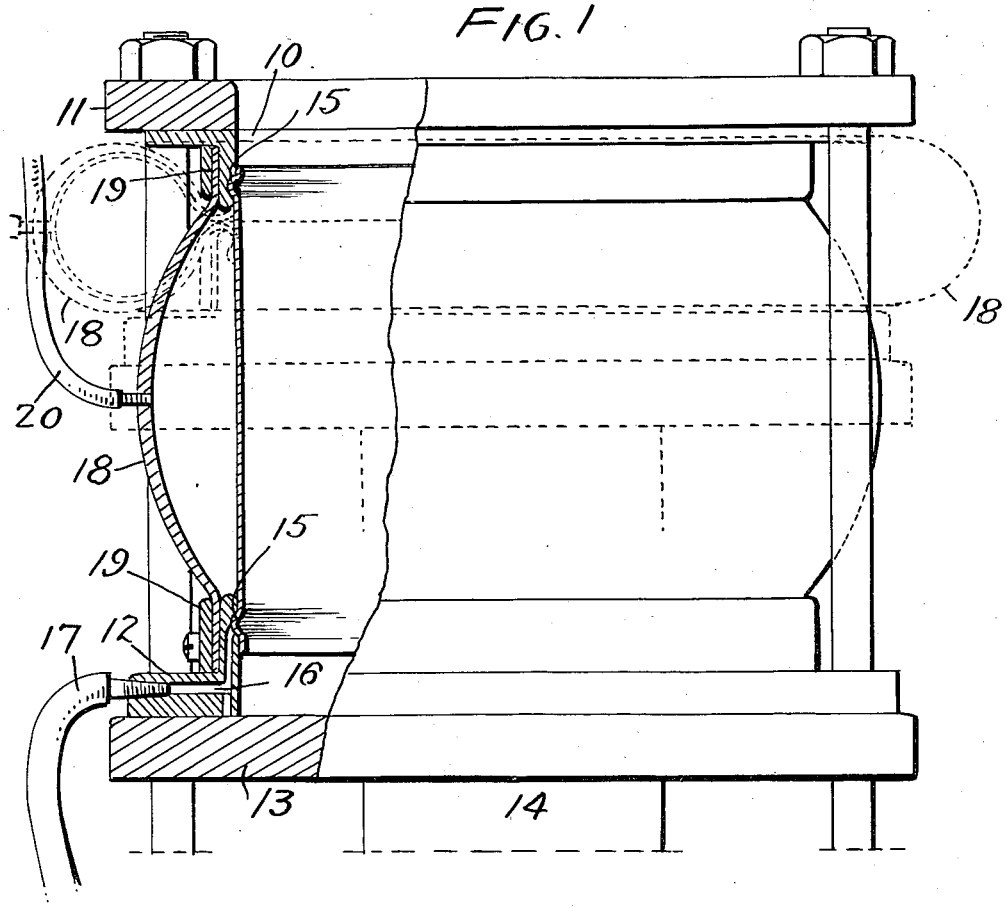
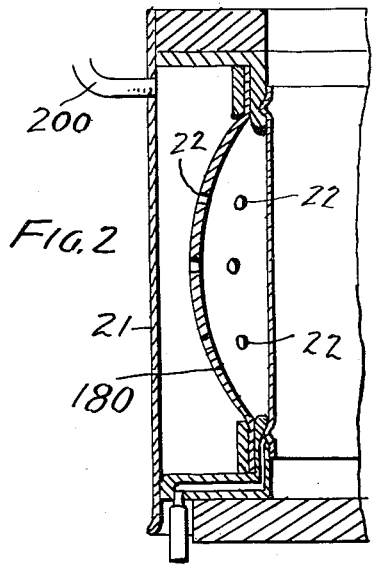
Inventor
Fred T. Roberts,
By Chas. J. Williamson
Attorney

Patented Oct. 29, 1935

2,019,361

UNITED STATES PATENT OFFICE

2,019,361

APPARATUS FOR MAKING HOLLOW RUBBER ARTICLES

Fred T. Roberts, Ridgewood, N. J., assignor to Frank A. Daly, Pawtucket, R. I., as trustee Application June 12, 1931, Serial No. 543,961

7 Claims. (Cl. 154—14)

My invention relates to the manufacture of tubular or hollow articles of rubber, and I will exemplify the invention by the instance of the inner tubes for pneumatic tires. The type of machine or apparatus to which my invention relates is one that has an annular chamber or mold across the open inner periphery of which a blank, in the form of a band or "pulley" is placed which, by the production of a vacuum or the reduction of air pressure within the mold, stretches or expands outward into the latter in all directions circumferentially, and by relative movement of the mold ends to which the edges of the blank are secured in an air-tight manner, such edges are moved towards each other and finally brought together and united, thus producing the complete annular inner tube with an annular seam on the inner periphery of the tube. As ordinarily constructed, the outer wall of the chamber or mold is metal and this has certain disadvantages, notably, the matter of cost and the necessity of using pneumatic packings, which besides other disadvantages, preclude the employment of as high a vacuum in the chamber as is desired.

The object of my invention is to provide a machine free from the disadvantage above mentioned, and which in these respects as well as others that will appear to those skilled in the art, will be a marked improvement.

My invention consists in whatever is described by or is included within the terms or scope of the appended claims.

In the drawing:—

Fig. 1 is a view in side elevation, with a portion in section, of apparatus embodying my invention, with parts in the position immediately after the placing of a blank in the apparatus and showing in dotted lines the position on the completion of the tube;

Fig. 2 is a view similar to Fig. 1 of another embodiment of my invention.

The basic or fundamental feature of my invention is the employment of a flexible wall for the mold chamber and thereby dispensing with the metal or rigid wall, such flexible wall, under vacuum or reduction of air pressure on its inner side, expanding outward with the blank in the form of a band or pulley following it and conforming to its shape in cross-section, the opposite edges of the blank and wall being moved together until the swelled out or expanded blank is completely closed and its edges brought together and united in an annular seam on its inner periphery.

Describing in detail what is shown in the drawing, there are two concentric rings of the same diameter, and of the same or substantially the same cross-section, an upper ring, 10, secured to a stationary bed, 11, and a lower ring, 12, secured to the top of the ram, 13, of a conventional hydraulic cylinder, 14, so that in the operation of the press, the lower ring is moved up and down with reference to the upper ring. Each ring is conveniently L-shape in cross section to provide a horizontal flange for attachment to the bed and platen respectively. On the inner periphery of each ring near the edge is an annular groove, 15, from which channels, 16, lead and which by a pipe or hose, 17, is connected with a vacuum pump so that when the opposite edges of the pulley blank are applied thereto and the air is exhausted through the passages, 16, such edges will be held air-tight in contact with the faces of the rings, with the intervening portion of the blank unsupported and free to belly or expand outward upon the reduction of pressure on the outer side thereof.

Secured at opposite upper and lower edges to the outer sides of the two rings, 10 and 12, and extending between them, is an annular wall or drum, 18, of flexible, and preferably resilient, material so that upon the reduction of air-pressure between such wall and the tube blank or pulley which it encircles, and accompanied by movement of the ram carried ring, 12, to the stationary ring, 10, will belly or expand outward under the corresponding outward expansion or bellying of the pulley or band blank, due to the superior air-pressure on the inner periphery of said pulley. As the movement of one blank-supporting ring towards the other proceeds, the results shown in Fig. 1 in dotted lines follow, namely, the flexible mold wall, 18, and the contained tube blank are formed into an annular tube, the opposite edges of the blank being brought and pressed together and thereby seamed. By the pressure from the impingement of the edges of the rings upon the interposed edges of rubber, the latter are cut off and the completed annular tube is ready for removal following the separation of the two rings by the movement of the lower ring, 12, away from the upper ring, 10.

The upper and lower edges of the flexible mold wall, 18, are clamped to the outer side of the respective rings, 10 and 12, with an air-tight joint as by means of a metal ring, 19, secured by screws at intervals. Such clamping ring may be split like a piston ring or it may be made of sections instead of being a continuous ring slit only at one point. Preferably the clamped portions of the flexible wall, 18, are thinned down and the wall is gradually thickened from each clamping ring towards the center, and such wall preferably has an initial bulge or concavo-convex formation in cross-section so that in cross-section its general contour is similar to that of an automobile tire of like construction. The thinning down of the mold wall, 18, is to render it flexible adjacent the clamps so that it may readily be caused to take the round form in cross-section required to complete the tube forming operation. Preferably such wall, 18, is of rubber.

As shown in Fig. 1, a flexible tube or hose, 20, it attached directly to the flexible wall, 18 and communicates with the interior thereof and which runs to the vacuum pump, but if desired, as shown in Fig. 2, the flexible wall, 180, may be enclosed by a metal wall, 21, should, for any reason, it be desired to use that construction, and the vacuum pump hose connection, 200, is then made with the space between the metal wall, 21, and the flexible wall, 180, and perforations, 22, are provided in the flexible wall, 180, leading between the chamber and the space between the flexible wall and the tube blank so that the air between the flexible wall, 180 and the tube blank may be exhausted.

Even though the flexible mold wall should buckle, as it is apt to do in places when in the stretched out position shown in Fig. 1, that in no manner affects the production of a perfect tube because when in the closed position shown in dotted lines in Fig. 1, such wall makes a smooth, even contour.

What I claim is:—

1. Hollow article making apparatus comprising opposite blank-supporting members which are relatively movable towards and from one another, a wall of yieldable material extending between such members, said members having parts that engage the blank at opposite sides between which the blank extends continuously and means to cause the subjection of the blank and said wall to air-pressure on one side that is superior to air-pressure on the opposite side, as relative movement of such members proceeds, said wall of yieldable material being in itself the means to give the final form to the article from the blank being operated on.

2. Hollow article making apparatus comprising opposite blank-supporting members which are relatively movable towards and from one another, a wall of yieldable material extending between such members, said members having parts that engage the blank at opposite sides between which the blank extends continuously and means to reduce air-pressure between the blank and said wall during relative movement of said members, said wall of yieldable material being in itself the means to give the final form to the article from the blank being operated on.

3. Hollow article making apparatus comprising two concentric ring-form members movable relative to one another, a flexible annular wall held at opposite edges to said members, means to hold an annular blank at opposite edges to said members within said wall, and means to exhaust air from the space within such wall, said wall of yieldable material being in itself the means to give the final form to the article from the blank being operated on.

4. A mold for hollow article making apparatus comprising a flexible annular wall that is concavo-convex in cross-section, supporting means for the opposite lips of said wall movable relative to one another in an axial direction, and means for supporting an annular sheet of rubber adjacent said lips and stretched across from one lip to the other, and means for exhausting air from the space between said rubber sheet and said wall, said wall of yieldable material being in itself the means to give the final form to the article from the blank being operated on.

5. Apparatus as in claim 1 in which the blank-supporting portions thereof terminate in opposite edges and relative movement of such members continues to a point where adjacent portions of the blank are pinched between them.

6. A method of making tubes from pulley-shape blanks characterized by the use of a flexible wall free to assume a circular shape in cross-section, holding the peripheral edges of the wall and a pulley shape blank to form an air space between the wall and blank and causing the edge-holding means to approach each other as the wall and blank are assuming the circular shape, and finally seaming the edges of the blank while in said circular shape.

7. A method as in claim 6 in which during the entire operation of converting the blank to the circular shape in cross-section, the flexible wall is free from contact with any rigid surface tending to resist the change of form from a pulley-form blank to the final circular shape.

FRED T. ROBERTS.